(12) United States Patent
Briggs et al.

(10) Patent No.: US 10,280,785 B2
(45) Date of Patent: May 7, 2019

(54) SHROUD ASSEMBLY FOR A TURBINE ENGINE

(71) Applicant: General Electric Company, Schenectady, NY (US)

(72) Inventors: Robert David Briggs, West Chester, OH (US); Gulcharan Singh Brainch, West Chester, OH (US); Curtis Walton Stover, West Chester, OH (US)

(73) Assignee: General Electric Company, Schenectady, NY (US)

( * ) Notice: Subject to any disclaimer, the term of this patent is extended or adjusted under 35 U.S.C. 154(b) by 667 days.

(21) Appl. No.: 14/879,277

(22) Filed: Oct. 9, 2015

(65) Prior Publication Data

US 2016/0186605 A1    Jun. 30, 2016

Related U.S. Application Data

(60) Provisional application No. 62/073,539, filed on Oct. 31, 2014.

(51) Int. Cl.
*F01D 11/24* (2006.01)

(52) U.S. Cl.
CPC .......... *F01D 11/24* (2013.01); *F05D 2240/11* (2013.01); *F05D 2250/12* (2013.01); *F05D 2250/14* (2013.01); *F05D 2250/141* (2013.01); *F05D 2250/21* (2013.01); *F05D 2250/22* (2013.01); *F05D 2250/23* (2013.01); *F05D 2260/201* (2013.01); *F05D 2260/2212* (2013.01); *F05D 2260/2214* (2013.01); *Y02T 50/676* (2013.01)

(58) Field of Classification Search
CPC .......... F01D 11/08; F01D 11/18; F01D 11/24
See application file for complete search history.

(56) References Cited

U.S. PATENT DOCUMENTS

| 4,293,275 A | 10/1981 | Kobayashi et al. |
| 4,416,585 A | 11/1983 | Abdel-Messeh |
| 4,446,693 A | 5/1984 | Pidcock et al. |

(Continued)

FOREIGN PATENT DOCUMENTS

| DE | 19526917 A1 | 1/1997 |
| EP | 0845580 A2 | 6/1998 |

(Continued)

OTHER PUBLICATIONS

PCT Search Report and Written Opinion issued in connection with Related PCT Application No. PCT/US2015/057718 dated Jun. 16, 2016.

(Continued)

*Primary Examiner* — Jason Shanske
*Assistant Examiner* — Sabbir Hasan
(74) *Attorney, Agent, or Firm* — General Electric Company; William Andes (57) ABSTRACT

A shroud assembly for a turbine section of a turbine engine includes a shroud plate in thermal communication with a hot combustion gas flow and a baffle overlying the shroud plate to define a region. One or more shaped cooling features are located along the region such that a cooling fluid flow passing through the region encounters the shaped cooling features to increase the turbulence of the cooling fluid flow.

23 Claims, 6 Drawing Sheets

(56) References Cited

U.S. PATENT DOCUMENTS

| | | |
|---|---|---|
| 4,474,532 A | 10/1984 | Pazder |
| 4,515,526 A | 5/1985 | Levengood |
| 4,669,957 A | 6/1987 | Phillips et al. |
| 4,775,296 A | 10/1988 | Schwarzmann et al. |
| 5,062,768 A | 11/1991 | Marriage |
| 5,096,379 A | 3/1992 | Stroud et al. |
| 5,288,207 A | 2/1994 | Linask |
| 5,344,283 A | 9/1994 | Magowan et al. |
| 5,361,828 A | 11/1994 | Lee et al. |
| 5,382,133 A | 1/1995 | Moore et al. |
| 5,395,212 A | 3/1995 | Anzai et al. |
| 5,603,606 A | 2/1997 | Glezer et al. |
| 5,611,662 A | 3/1997 | Cunha |
| 5,626,017 A | 5/1997 | Sattelmayer |
| 5,681,144 A | 10/1997 | Spring et al. |
| 5,695,321 A | 12/1997 | Kercher |
| 5,704,763 A | 1/1998 | Lee |
| 5,779,438 A | 7/1998 | Wilfert |
| 5,797,726 A | 8/1998 | Lee |
| 6,000,466 A | 12/1999 | Aoyagi et al. |
| 6,026,892 A | 2/2000 | Kim et al. |
| 6,099,251 A | 8/2000 | Lafleur |
| 6,174,134 B1 | 1/2001 | Lee et al. |
| 6,227,804 B1 | 5/2001 | Koga et al. |
| 6,234,755 B1 | 5/2001 | Bunker et al. |
| 6,241,468 B1 | 6/2001 | Lock et al. |
| 6,254,346 B1 | 7/2001 | Fukuno et al. |
| 6,287,075 B1 | 9/2001 | Kercher |
| 6,290,462 B1 | 9/2001 | Ishiguro et al. |
| 6,331,098 B1 | 12/2001 | Lee |
| 6,368,060 B1 | 4/2002 | Fehrenbach et al. |
| 6,383,602 B1 | 5/2002 | Fric et al. |
| 6,406,260 B1 | 6/2002 | Trindade et al. |
| 6,416,283 B1 | 7/2002 | Johnson et al. |
| 6,547,524 B2 | 4/2003 | Kohli et al. |
| 6,582,584 B2 | 6/2003 | Lee et al. |
| 6,607,355 B2 | 8/2003 | Cunha et al. |
| 6,609,884 B2 | 8/2003 | Harvey |
| 6,644,921 B2 | 11/2003 | Bunker et al. |
| 6,722,134 B2 | 4/2004 | Bunker |
| 6,868,060 B2 | 3/2005 | Barzegar et al. |
| 6,890,154 B2 | 5/2005 | Cunha |
| 6,896,509 B2 | 5/2005 | Carroni et al. |
| 6,916,150 B2 | 7/2005 | Liang |
| 6,932,573 B2 | 8/2005 | Liang |
| 6,939,102 B2 | 9/2005 | Liang |
| 6,981,846 B2 | 1/2006 | Liang |
| 6,984,102 B2 | 1/2006 | Bunker et al. |
| 7,094,031 B2 | 8/2006 | Lee et al. |
| 7,104,757 B2 | 9/2006 | Gross |
| 7,128,533 B2 | 10/2006 | Liang |
| 7,137,781 B2 | 11/2006 | Harvey et al. |
| 7,186,084 B2 | 3/2007 | Bunker et al. |
| 7,195,458 B2 | 3/2007 | Liang |
| 7,300,242 B2 | 11/2007 | Liang |
| 7,399,160 B2 | 7/2008 | Harvey et al. |
| 7,413,407 B2 | 8/2008 | Liang |
| 7,445,432 B2 | 11/2008 | Levine et al. |
| 7,520,723 B2 | 4/2009 | Liang |
| 7,534,089 B2 | 5/2009 | Liang |
| 7,547,191 B2 | 6/2009 | Liang |
| 7,553,534 B2 | 6/2009 | Bunker |
| 7,637,720 B1 | 12/2009 | Liang |
| 7,665,965 B1 | 2/2010 | Liang |
| 7,690,892 B1 | 4/2010 | Liang |
| 7,699,583 B2 | 4/2010 | Cunha |
| 7,713,026 B1 | 5/2010 | Liang |
| 7,722,327 B1 | 5/2010 | Liang |
| 7,766,616 B2 | 8/2010 | Baldauf et al. |
| 7,806,658 B2 | 10/2010 | Liang et al. |
| 7,824,156 B2 | 11/2010 | Dellmann et al. |
| 7,866,948 B1 | 1/2011 | Liang |
| 7,938,624 B2 | 5/2011 | Tibbott |
| 7,985,050 B1 | 7/2011 | Liang |
| 8,052,390 B1 | 11/2011 | Liang |
| 8,066,484 B1 | 11/2011 | Liang |
| 8,137,056 B2 * | 3/2012 | Fujimoto ............ F01D 11/24 415/116 |
| 8,167,560 B2 * | 5/2012 | Liang ................ F01D 5/187 416/97 R |
| 8,186,942 B2 | 5/2012 | Haas |
| 8,408,872 B2 * | 4/2013 | Briggs ................ F01D 9/04 415/115 |
| 8,672,613 B2 | 3/2014 | Bunker |
| 2005/0042074 A1 | 2/2005 | Liang |
| 2005/0084371 A1 | 4/2005 | Fried et al. |
| 2006/0073011 A1 | 4/2006 | Lee et al. |
| 2006/0099073 A1 | 5/2006 | Djeridane et al. |
| 2007/0128029 A1 | 6/2007 | Liang |
| 2007/0297916 A1 | 12/2007 | Levine et al. |
| 2007/0297917 A1 | 12/2007 | Levine et al. |
| 2008/0164013 A1 | 7/2008 | Maziers |
| 2008/0267784 A1 | 10/2008 | Bolms et al. |
| 2009/0087312 A1 | 4/2009 | Bunker et al. |
| 2009/0145581 A1 | 6/2009 | Hoffman et al. |
| 2010/0040480 A1 | 2/2010 | Webster et al. |
| 2010/0221121 A1 | 9/2010 | Liang |
| 2010/0226761 A1 | 9/2010 | Liang |
| 2010/0226791 A1 | 9/2010 | Fujimura et al. |
| 2010/0247328 A1 | 9/2010 | Cunha |
| 2010/0303635 A1 | 12/2010 | Townes et al. |
| 2011/0038709 A1 | 2/2011 | Liang et al. |
| 2011/0164960 A1 | 7/2011 | Maldonado |
| 2012/0070306 A1 | 3/2012 | Lee et al. |
| 2012/0324897 A1 | 12/2012 | McMahan et al. |
| 2013/0089434 A1 | 4/2013 | Simpson et al. |
| 2013/0205790 A1 | 8/2013 | Xu et al. |
| 2013/0209228 A1 | 8/2013 | Xu |
| 2013/0209229 A1 | 8/2013 | Xu et al. |
| 2014/0219814 A1 | 8/2014 | Heselhaus |

FOREIGN PATENT DOCUMENTS

| | | |
|---|---|---|
| EP | 1118747 A2 | 7/2001 |
| EP | 1655453 A1 | 5/2006 |
| EP | 1882818 A1 | 1/2008 |
| EP | 1975372 A1 | 10/2008 |
| EP | 2087206 A1 | 8/2009 |
| EP | 2107215 A1 | 10/2009 |
| GB | 2262314 A | 6/1993 |
| GB | 2358226 A | 7/2001 |
| JP | 08505921 A | 6/1996 |
| JP | 08338202 A | 12/1996 |
| JP | 3040590 B2 | 5/2000 |
| JP | 3124109 B2 | 1/2001 |
| JP | 3182602 B2 | 7/2001 |
| JP | 3586637 B2 | 11/2004 |
| JP | 2006105141 A | 4/2006 |
| JP | 2008506061 A | 2/2008 |
| WO | 2014055259 A1 | 4/2014 |

OTHER PUBLICATIONS

Shawn Michael Pearson et al., U.S. Appl. No. 62/004,693, filed May 29, 2014.

Jason Randolph Allen et al., U.S. Appl. No. 14/712,287, filed May 14, 2015.

Kevin Robert Feldmann et al., U.S. Appl. No. 14/718,120, filed May 21, 2015.

Ronald Scott Bunker et al., U.S. Appl. No. 62/004,682, filed May 29, 2014.

Ronald Scott Bunker, U.S. Appl. No. 62/004,689, filed May 29, 2014.

Ronald Scott Bunker, U.S. Appl. No. 62/004,677, filed May 29, 2014.

Ronald Scott Bunker et al., U.S. Appl. No. 62/073,547, filed Oct. 31, 2014.

Ronald Scott Bunker, U.S. Appl. No. 62/073,455, filed Oct. 31, 2014.

Ronald Scott Bunker et al., U.S. Appl. No. 62/073,429, filed Oct. 31, 2014.

(56) References Cited

OTHER PUBLICATIONS

Ronald Scott Bunker, U.S. Appl. No. 62/073,388, filed Oct. 31, 2014.
Great Britain Search Report and Opinion issued in connection with related GB Application No. 1015936.6 dated Jan. 14, 2011.
U.S. Non-Final Office Action issued in connection with Related U.S. Appl. No. 12/618,241 dated Aug. 10, 2012.
Unofficial English Translation of Japanese Office Action issued in connection with related JP Application No. 2010208729 dated Jun. 3, 2014.
Unofficial English Translation of Japanese Notice of Allowance issued in connection with related JP Application No. 2010208729 dated Jul. 22, 2014.
Great Britain Office Action issued in connection with related GB Application No. 1015936.6 dated May 28, 2015.
Great Britain Office Action issued in connection with related GB Application No. 1015936.6 dated Aug. 11, 2015.
Canadian Office Action issued in connection with Related CA Application No. 2714543 dated Jun. 29, 2016.
PCT Search Report and Written Opinion issued in connection with related PCT Application No. PCT/US2015/033240 dated Oct. 8, 2015.
European Search Report and Opinion issued in connection with related EP Application No. 15168677.1 dated Nov. 2, 2015.
European Search Report and Opinion issued in connection with related EP Application No. 15192372.9 dated Mar. 4, 2016.
European Search Report and Opinion issued in connection with related EP Application No. 15192458.6 dated Mar. 8, 2016.

\* cited by examiner

SHROUD ASSEMBLY FOR A TURBINE ENGINE

CROSS-REFERENCE TO RELATED APPLICATION

This non-provisional application claims the benefit of priority under 35 U.S.C. § 119(e) to U.S. Provisional Patent Application No. 62/073,539, entitled "SHROUD ASSEMBLY FOR A TURBINE ENGINE", filed Oct. 31, 2014, which is herein incorporated in its entirety by reference.

BACKGROUND OF THE INVENTION

Turbine engines, and particularly gas or combustion turbine engines, are rotary engines that extract energy from a flow of combusted gases passing through the engine onto a multitude of turbine blades. Gas turbine engines have been used for land and nautical locomotion and power generation, but are most commonly used for aeronautical applications such as for airplanes, including helicopters. In aircraft, gas turbine engines are used for propulsion of the aircraft. In terrestrial applications, turbine engines are often used for power generation.

Gas turbine engines for aircraft are designed to operate at high temperatures to maximize engine efficiency, so cooling of certain engine components, such as the high pressure turbine and the low pressure turbine, may be necessary. Typically, cooling is accomplished by ducting cooler air from the high and/or low pressure compressors to the engine components which require cooling. Temperatures in the high pressure turbine are around 1000° C. to 2000° C. and the cooling air from the compressor is about 500 to 700° C. While the compressor air is a high temperature, it is cooler relative to the turbine air, and may be used to cool the turbine.

Turbine shrouds have been cooled using different methods, including conventional convection cooling and impingement cooling. In conventional convection cooling, cooling air flows along a cooling path through the shroud, and heat is transferred by convection into the flowing air. In impingement cooling, the inner surface of the shroud is impinged with high velocity air in order to transfer more heat by convection than with typical convection cooling.

Particles, such as dirt, dust, sand, and other environmental contaminants, in the cooling air can cause a loss of cooling and reduced operational time or "time-on-wing" for the aircraft environment. For example, particles supplied to the turbine blades can clog, obstruct, or coat the flow passages and surfaces of the blades, which can reduce the lifespan of the turbine. This problem is exacerbated in certain operating environments around the globe where turbine engines are exposed to significant amounts of airborne particles.

BRIEF DESCRIPTION OF THE INVENTION

In one aspect, the invention relates to a shroud assembly for a turbine section of a turbine engine. The shroud assembly includes a shroud plate having a hot surface in thermal communication with a hot combustion gas flow and a cooling surface, with the cooling surface being different than the hot surface, a baffle overlying the shroud plate and having a first surface in fluid communication with a cooling fluid flow and a second surface, different from the first surface, spaced from the cooling surface and defining a region between the second surface and the cooling surface of the shroud plate, a cooling fluid inlet extending through the baffle from the first surface to the second surface through which the cooling fluid flow may enter the region, at least one cooling fluid outlet extending from the region to an exterior of the shroud plate and through which the cooling fluid flow may exit the region, wherein the at least one cooling fluid outlet is spaced from the cooling fluid inlet such that the cooling fluid flow entering the cooling fluid inlet travels downstream through the region to the at least one cooling fluid outlet to exit the region, and at least one shaped cooling feature located along the region between the cooling fluid inlet and the at least one cooling fluid outlet. The cooling fluid flow passing downstream through the region encounters the at least one shaped cooling feature to increase the turbulence of the cooling fluid flow.

DESCRIPTION OF EMBODIMENTS OF THE INVENTION

The described embodiments of the present invention are directed to cooling an engine component, particularly in a turbine engine. For purposes of illustration, the present invention will be described with respect to an aircraft gas turbine engine. It will be understood, however, that the invention is not so limited and may have general applicability in non-aircraft applications, such as other mobile applications and non-mobile industrial, commercial, and residential applications. It is further noted that while the various embodiments of systems, methods, and other devices related to the invention are discussed and shown herein in the context of a shroud assembly for a turbine section of a turbine engine, the invention may be applied to other sections of a turbine engine. Some non-limiting examples may include, but are not limited to, turbine vanes, turbine blades, turbine nozzles, combustor liners, turbine disks, and turbine seals. Further, the invention may have non-engine applications as well.

As used herein, the terms "axial" or "axially" refer to a dimension along a longitudinal axis of an engine. The term "forward" used in conjunction with "axial" or "axially" refers to moving in a direction toward the engine inlet, or a component being relatively closer to the engine inlet as compared to another component. The term "aft" used in conjunction with "axial" or "axially" refers to a direction toward the rear or outlet of the engine relative to the engine centerline.

As used herein, the terms "radial" or "radially" refer to a dimension extending between a center longitudinal axis of the engine and an outer engine circumference. The use of the terms "proximal" or "proximally," either by themselves or in conjunction with the terms "radial" or "radially," refers to moving in a direction toward the center longitudinal axis, or a component being relatively closer to the center longitudinal axis as compared to another component. The use of the terms "distal" or "distally," either by themselves or in conjunction with the terms "radial" or "radially," refers to moving in a direction toward the outer engine circumference, or a component being relatively closer to the outer engine circumference as compared to another component.

All directional references (e.g., radial, axial, proximal, distal, upper, lower, upward, downward, left, right, lateral, front, back, top, bottom, above, below, vertical, horizontal, clockwise, counterclockwise) are only used for identification purposes to aid the reader's understanding of the present invention, and do not create limitations, particularly as to the position, orientation, or use of the invention. Connection references (e.g., attached, coupled, connected, and joined) are to be construed broadly and may include intermediate members between a collection of elements and relative movement between elements unless otherwise indicated. As such, connection references do not necessarily infer that two elements are directly connected and in fixed relation to each other. The exemplary drawings are for purposes of illustration only and the dimensions, positions, order and relative sizes reflected in the drawings attached hereto may vary.

Figure 1:
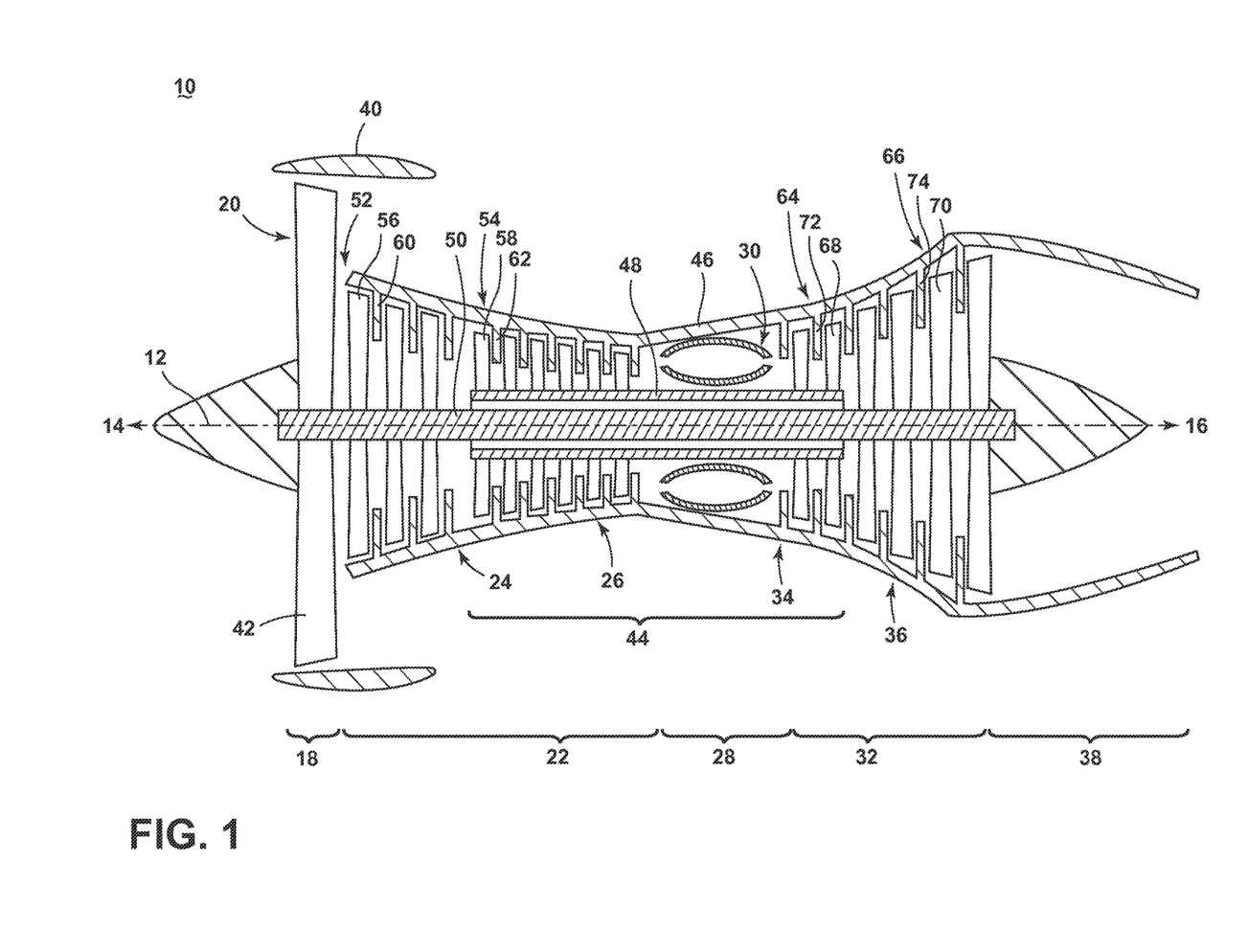
FIG. 1 is a schematic cross-sectional diagram of a gas turbine engine for an aircraft.

FIG. 1 is a schematic cross-sectional diagram of a gas turbine engine 10 for an aircraft. The engine 10 has a generally longitudinally extending axis or centerline 12 extending forward 14 to aft 16. The engine 10 includes, in downstream serial flow relationship, a fan section 18 including a fan 20, a compressor section 22 including a booster or low pressure (LP) compressor 24 and a high pressure (HP) compressor 26, a combustion section 28 including a combustor 30, a turbine section 32 including a HP turbine 34, and a LP turbine 36, and an exhaust section 38.

The fan section 18 includes a fan casing 40 surrounding the fan 20. The fan 20 includes a plurality of fan blades 42 disposed radially about the centerline 12.

The HP compressor 26, the combustor 30, and the HP turbine 34 form a core 44 of the engine 10 which generates combustion gases. The core 44 is surrounded by core casing 46 which can be coupled with the fan casing 40.

A HP shaft or spool 48 disposed coaxially about the centerline 12 of the engine 10 drivingly connects the HP turbine 34 to the HP compressor 26. A LP shaft or spool 50, which is disposed coaxially about the centerline 12 of the engine 10 within the larger diameter annular HP spool 48, drivingly connects the LP turbine 36 to the LP compressor 24 and fan 20.

The LP compressor 24 and the HP compressor 26 respectively include a plurality of compressor stages 52, 54, in which a set of compressor blades 56, 58 rotate relative to a corresponding set of static compressor vanes 60, 62 (also called a nozzle) to compress or pressurize the stream of fluid passing through the stage. In a single compressor stage 52, 54, multiple compressor blades 56, 58 may be provided in a ring and may extend radially outwardly relative to the centerline 12, from a blade platform to a blade tip, while the corresponding static compressor vanes 60, 62 are positioned downstream of and adjacent to the rotating blades 56, 58. It is noted that the number of blades, vanes, and compressor stages shown in FIG. 1 were selected for illustrative purposes only, and that other numbers are possible.

The HP turbine 34 and the LP turbine 36 respectively include a plurality of turbine stages 64, 66, in which a set of turbine blades 68, 70 are rotated relative to a corresponding set of static turbine vanes 72, 74 (also called a nozzle) to extract energy from the stream of fluid passing through the stage. In a single turbine stage 64, 66, multiple turbine blades 68, 70 may be provided in a ring and may extend radially outwardly relative to the centerline 12, from a blade platform to a blade tip, while the corresponding static turbine vanes 72, 74 are positioned upstream of and adjacent to the rotating blades 68, 70. It is noted that the number of blades, vanes, and turbine stages shown in FIG. 1 were selected for illustrative purposes only, and that other numbers are possible.

In operation, the rotating fan 20 supplies ambient air to the LP compressor 24, which then supplies pressurized ambient air to the HP compressor 26, which further pressurizes the ambient air. The pressurized air from the HP compressor 26 is mixed with fuel in combustor 30 and ignited, thereby generating combustion gases. Some work is extracted from these gases by the HP turbine 34, which drives the HP compressor 26. The combustion gases are discharged into the LP turbine 36, which extracts additional work to drive the LP compressor 24, and the exhaust gas is ultimately discharged from the engine 10 via the exhaust section 38. The driving of the LP turbine 36 drives the LP spool 50 to rotate the fan 20 and the LP compressor 24.

Some of the ambient air supplied by the fan 20 may bypass the engine core 44 and be used for cooling of portions, especially hot portions, of the engine 10, and/or used to cool or power other aspects of the aircraft. Other sources of cooling fluid may be, but is not limited to, fluid discharged from the LP compressor 24 or the HP compressor 26.

In the context of a turbine engine, the hot portions of the engine are normally downstream of the combustor 30, especially the turbine section 32, with the HP turbine 34 being the hottest portion as it is directly downstream of the combustion section 28. In one example, the hot portion may be a shroud or shroud assembly located adjacent to the rotating blades of the turbine or compressor.

Figure 2:
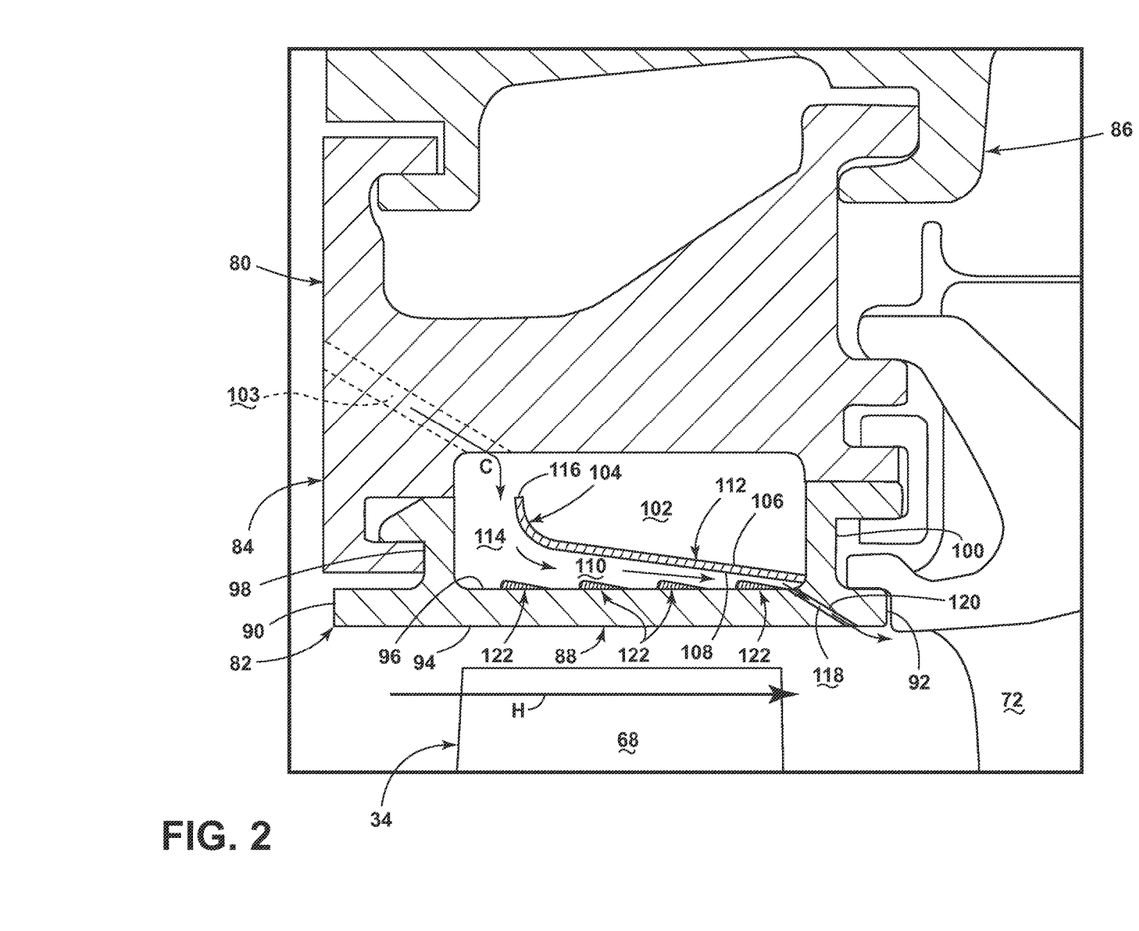
FIG. 2 is a schematic sectional view showing a shroud assembly for the engine from FIG. 1 according to a first embodiment of the invention.

FIG. 2 is a schematic view showing a shroud assembly 80 for the engine 10 from FIG. 1 according to first embodiment of the invention, which may be cooled by the cooling fluid. The shroud assembly 80 is shown as being associated with a blade 68 of the HP turbine 34, although the shroud assembly can alternatively be associated with the LP turbine 36, the LP compressor 24, or the HP compressor 26.

The shroud assembly 80 includes a shroud 82 spaced radially about the blades 68 and a hanger 84 configured to couple the shroud 82 with a casing of the engine 10 and retain the shroud in position, adjacent to the blade 68. The hanger 84 can directly mount the shroud 82 to the core casing 46 of the engine (see FIG. 1), or can indirectly couple the shroud 82 with the core casing 46 via a hanger support 86, as shown herein. The shroud 82 and hanger 84 extend circumferentially, and the engine 10 from FIG. 1 may include multiple shroud assemblies 80 extending around the circumference defined by the blades 68.

The shroud 82 includes a shroud plate 88 having a leading edge 90 and a trailing edge 92. The shroud plate has a hot surface 94 in thermal communication with a hot combustion gas flow H, such as heated gas emitted from the combustor 30, and a cooling surface 96. Here, the hot surface 94 confronts one of the blades 68 of the HP turbine 34 and the cooling surface 96 is opposite the hot surface 94. While not shown, a protective coating, such as a thermal barrier coating, can be applied to the hot surface 94 of the shroud 82. The shroud 82 further includes a leading wall 98 and a trailing wall 100 that extend radially from the shroud plate 88 and engage the hanger 84. The interior surface of the walls 98, 100 and the cooling surface 96 define an interior 102 of the shroud 82. A cooling fluid inlet 103 to the interior 102 of the shroud 82 may extend through the hanger 84.

The shroud assembly 80 further includes a baffle 104 which overlies at least a portion of the shroud 82 and directs a cooling fluid flow C toward the cooling surface 96 of the shroud plate 88. The baffle 104 has a first surface 106 in fluid communication with the cooling fluid flow C and a second surface 108 that is spaced from the cooling surface 96 and defines a region 110 between the baffle 104 and shroud plate 88. The region 110 can generally extend between the leading edge 90 and the trailing edge 92 of the shroud 82.

As shown, the baffle 104 comprises an angled wall 112 located within the interior 102 of the shroud 82, with the angled wall 112 defining the first and second surfaces 106, 108. The region 110 between the second surface 108 of the baffle 104 and the cooling surface 96 is formed from at least a portion of the interior 102 of the shroud 82, including the radially-extending walls 98, 100 of the shroud 82.

A cooling fluid inlet 114 to the region 110 is defined by the baffle 104, and may extend through the baffle 104, from the first surface 106 to the second surface 108, or may be defined by a portion of the baffle 104 that is spaced from a portion of the shroud 82. The inlet 114 can be proximate to an upstream end of the region 110. As shown, the inlet 114 is proximate to the leading edge 90 of the shroud 82, and is defined by an end 116 of the baffle wall 112 and the interior surface of the leading wall 98 of the shroud 82. The cooling fluid flow C passes through the inlet 114 and is directed toward the cooling surface 96 of the shroud 82.

At least one cooling fluid outlet 118, through which the cooling fluid flow C may exit the region 110, extends from the region 110 to an exterior of the shroud plate 88. The at least one outlet 118 is spaced from the inlet 114, such that the cooling fluid flow C entering the inlet 114 travels downstream through the region 110 to exit through the outlet 118. The outlet 118 can be proximate a downstream end of the region 110.

As shown, the outlet 118 is defined by a passage 120 that is proximate to the trailing edge 92 of the shroud 82, and aft of the inlet 114 relative to the centerline 12 of the engine 10 (FIG. 1). The passage 120 has a flow component in the same direction as the direction of the cooling fluid flow C through the region 110. The passage 120 shown extends in a generally aft direction.

The outlet passage 120 can be a film hole that extends through at least a portion of the shroud 82 between the hot and cooling surfaces 94, 96 to fluidly couple the region 110 to an exterior of the shroud 82. The cooling fluid flow C may pass out of the region 110 via the film hole 120 to form a cooling film over some or all of the hot surface 94 of the shroud 82. Multiple film holes 120 can be provided, and can be forward or aft of the blades 68 because the fluid motion at the tip of the rotating blades 68 interferes with the fluid leaving the film holes 120 at the hot surface 94. Furthermore, the film holes 120 are not limited to extending through the shroud plate 88, but may also extend through the leading wall 98 and/or the trailing wall 100. In the illustrated embodiment, the film hole 120 extends through the shroud plate 88 near the trailing edge 92 and is downstream of the blade 68.

The region 110 can extend axially relative to the centerline 12 of the engine 10 (FIG. 1), as well as radially. The cross-sectional area of the region 110, defined between the baffle 104 and the cooling surface 96, can change along the axial extent to of the region 110 between the inlet 114 and the outlet 118 in order to accelerate the cooling fluid flow C through the region 110. In the illustrated example, the angled wall 112 of the baffle 104 converges toward the cooling surface 96 between the inlet 114 and the outlet 118, and so the cross-sectional area of the region 110 decreases substantially continuously between the inlet 114 and the outlet 118. Alternatively, in cases where the cooling fluid flow C is being extracted by the film holes along the length of region 110, the angled wall 112 of the baffle 104 can maintain an essentially constant velocity in the region 110.

The shroud assembly 80 further includes at least one shaped cooling feature 122 located along the region 110 between the inlet 114 and the at least one outlet 118. The cooling feature 122 is shaped such that, as the cooling fluid flow C passing downstream through the region 110 encounters the feature 122, mixing and turbulence of the cooling fluid flow C increases. Increasing the turbulence of the cooling fluid flow C can avoid the formation of stagnation points on the cooling surface 96. The shaped cooling feature 122 also increases the surface area of the cooling surface 96 for heat transfer. In the illustrated embodiment, multiple shaped cooling features 122 are provided on the cooling surface 96, and extend upwardly from the cooling surface 96. The cooling features 122 can be cast with the shroud 82 or added the shroud 82, for example by additive manufacturing. One example of a suitable cooling feature 122 is a fastback turbulator more fully described in U.S. Pat. No. 8,408,872, issued Apr. 2, 2013, which is incorporated herein by reference in its entirety.

In operation, cooling fluid flow C is supplied to the shroud assembly 80 to cool the shroud 82, which is exposed to hot combustion gas H. In order to cool the shroud 82, the cooling fluid is at a temperature that is less than the operational temperature of the shroud 82; i.e. the temperature of the shroud 82 during normal operation of the engine 10. The cooling fluid flow C passes through the inlet 114, and into the region 110 defined within the shroud 82. The incoming cooling fluid flow C is guided by the baffle 104 over the cooling surface 96 and heat is transferred by convection from the shroud 82 into the flowing fluid. The convergence of the baffle 104 toward the cooling surface 96 accelerates the cooling fluid flow C through the region 110. Turbulence in the cooling fluid flow C increases as the cooling fluid flow encounters the shaped cooling features 122. The cooling fluid flow C may then pass through the film hole 120 to form a cooling film over some or all of the hot surface 94 of the shroud 82.

Figure 3:
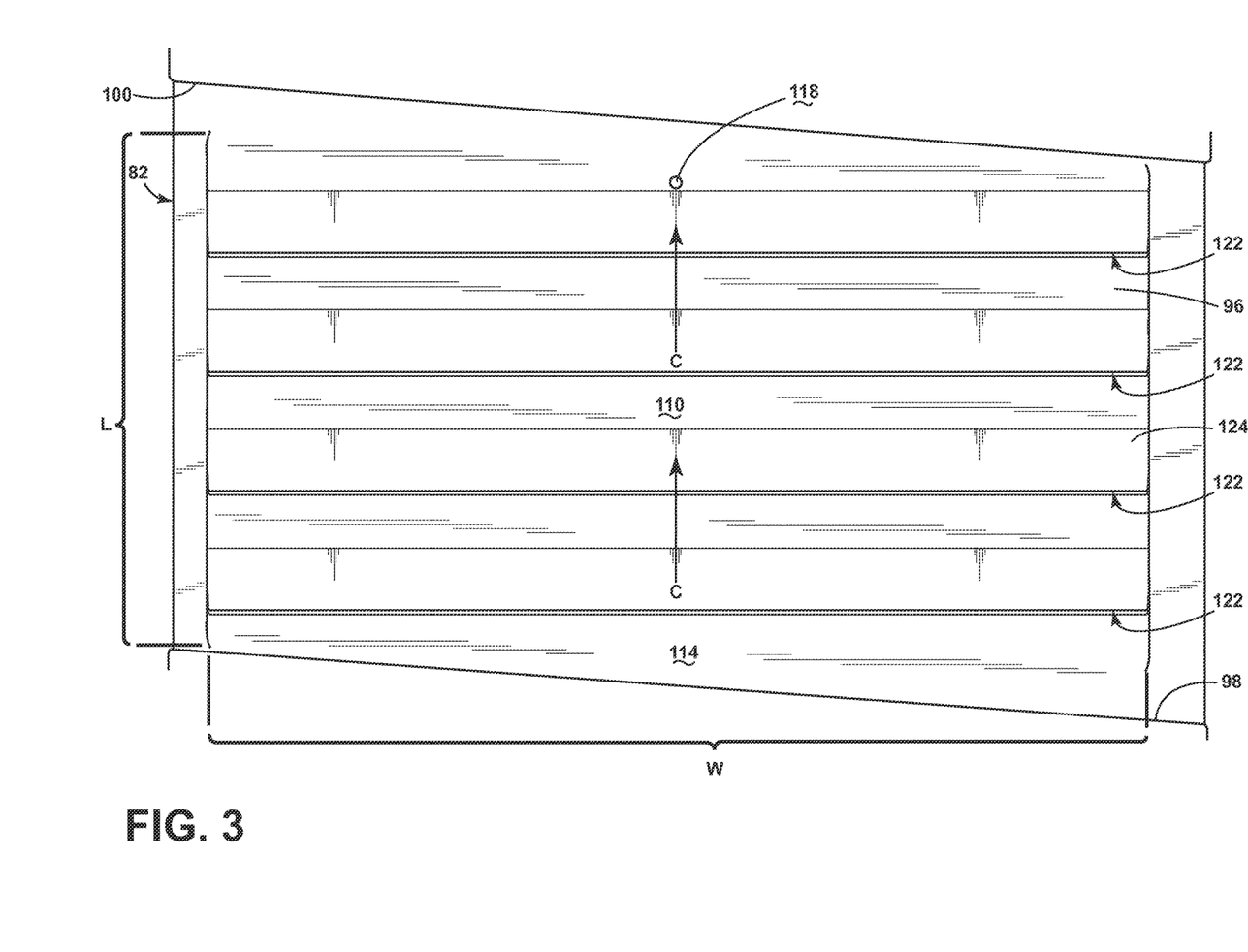
FIG. 3 is a plan view of a cooling surface of a shroud for the shroud assembly from FIG. 2.

FIG. 3 is a plan view of the cooling surface 96 of the shroud 82. The region 110 can comprise a channel 124 extending between the inlet 114 and outlet 118. The channel 124 has a length L between the inlet 114 and outlet 118 and a width W, the width being the lateral dimension of the channel 124 relative to the general direction of the cooling fluid flow C. In one example, the width-to-length ratio of the channel 124 can be about 3:1 or less. The width W of the channel 124 can remain approximately constant along the length L, as shown in FIG. 3, or can alternatively vary along the length L. Furthermore channel 124 need not run axially to the centerline 12 of the engine 10 (FIG. 1), but rather may extend at least partially about the circumference of the centerline 12.

Figure 4:
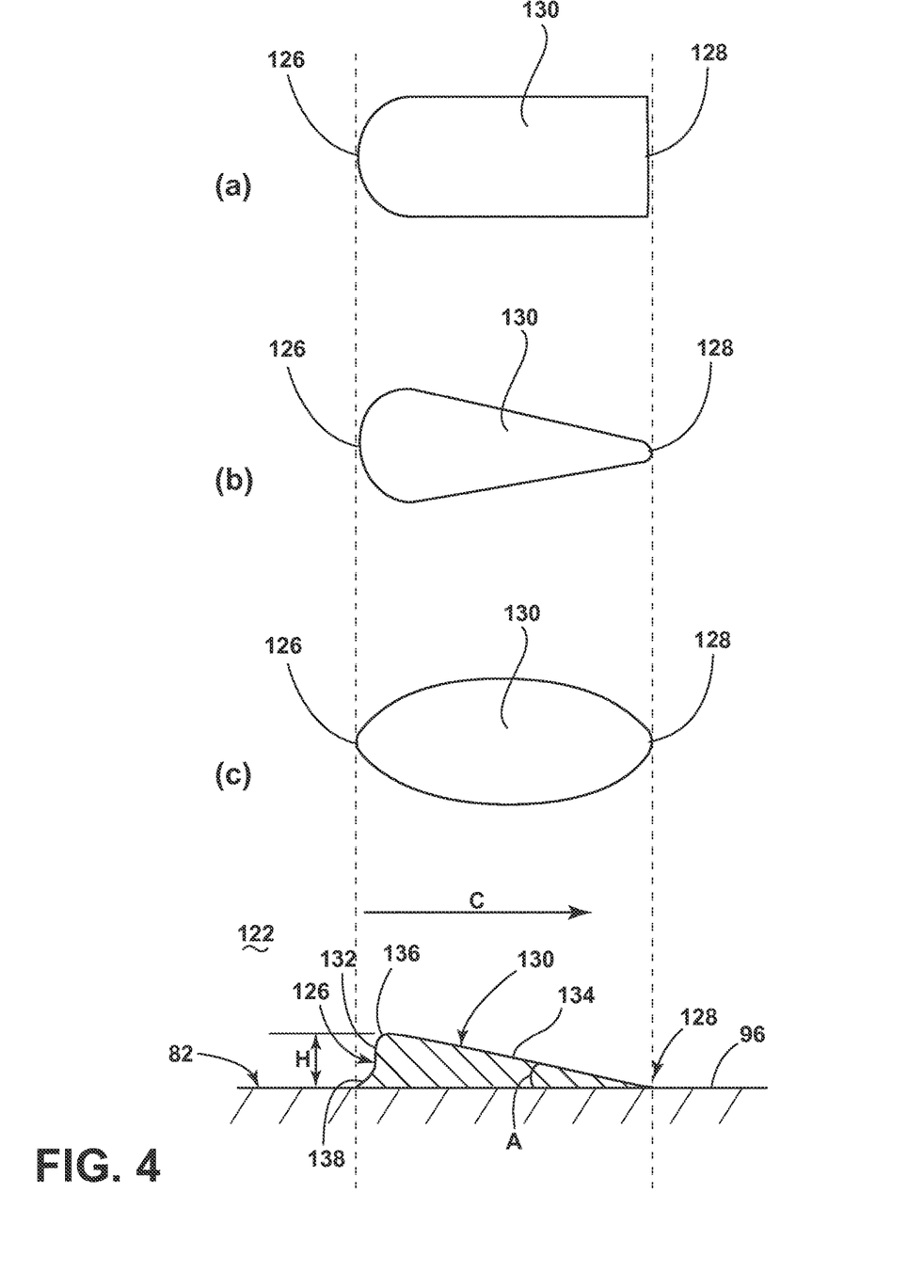
FIG. 4 is a profile view of a cooling feature for the shroud assembly from FIG. 2.

FIG. 4 is a profile view of one of the cooling features 122 of the shroud assembly 80 from FIG. 2. The cooling feature 122 can be provided as a turbulator having a leading edge 126 and a trailing edge 128, relative to the cooling fluid flow C, that are joined by a top edge 130. The leading edge 126 can be defined by a leading wall 132 that extends upwardly from the cooling surface 96 and the top edge 130 can be defined by a top wall 134 that extends upwardly from the trailing edge 128 at an angle to converge with the leading wall 132 at a peak or ridge 136.

The top wall 134 can taper from the leading wall 132 in the general direction of the cooling fluid flow C, and can be longer than the height of the leading wall 132. In one example, the height H of the leading wall 132 can be between 0.5 and 5 mm. The top edge 130 forms an angle A with the cooling surface 96 having a vertex generally at the trailing edge 128. In one example, the angle A can be between 10 degrees and 40 degrees.

The leading edge 126 forms a junction 138 with the cooling surface 96. The junction 138 can be a smooth transition between the cooling surface 96 and the cooling feature 122, as shown, or can be defined by a sharp edge between the cooling surface 96 and the cooling feature 122. A smooth transition may be preferable to avoid stagnation points on the cooling surface 96. The smooth transition can be an angled structure, such as an inclined ramp, or a radiused structure, such as a concave edge. Likewise, the ridge 136 can be a radiused structure, such as a convex edge.

The cooling feature 122 can have various plan forms. Some non-limiting examples are shown in FIG. 4, and include: (a) dome-shaped, in which the leading edge 126 is curved and the trailing edge 164 is flat; (b) teardrop-shaped, in which the top wall 130 is curved at the leading edge 1226 and tapered at the trailing edge 128; (c) eye-shaped, in which the top wall 130 is tapered at the leading and trailing edges 126, 128; or combinations thereof.

Figure 5:
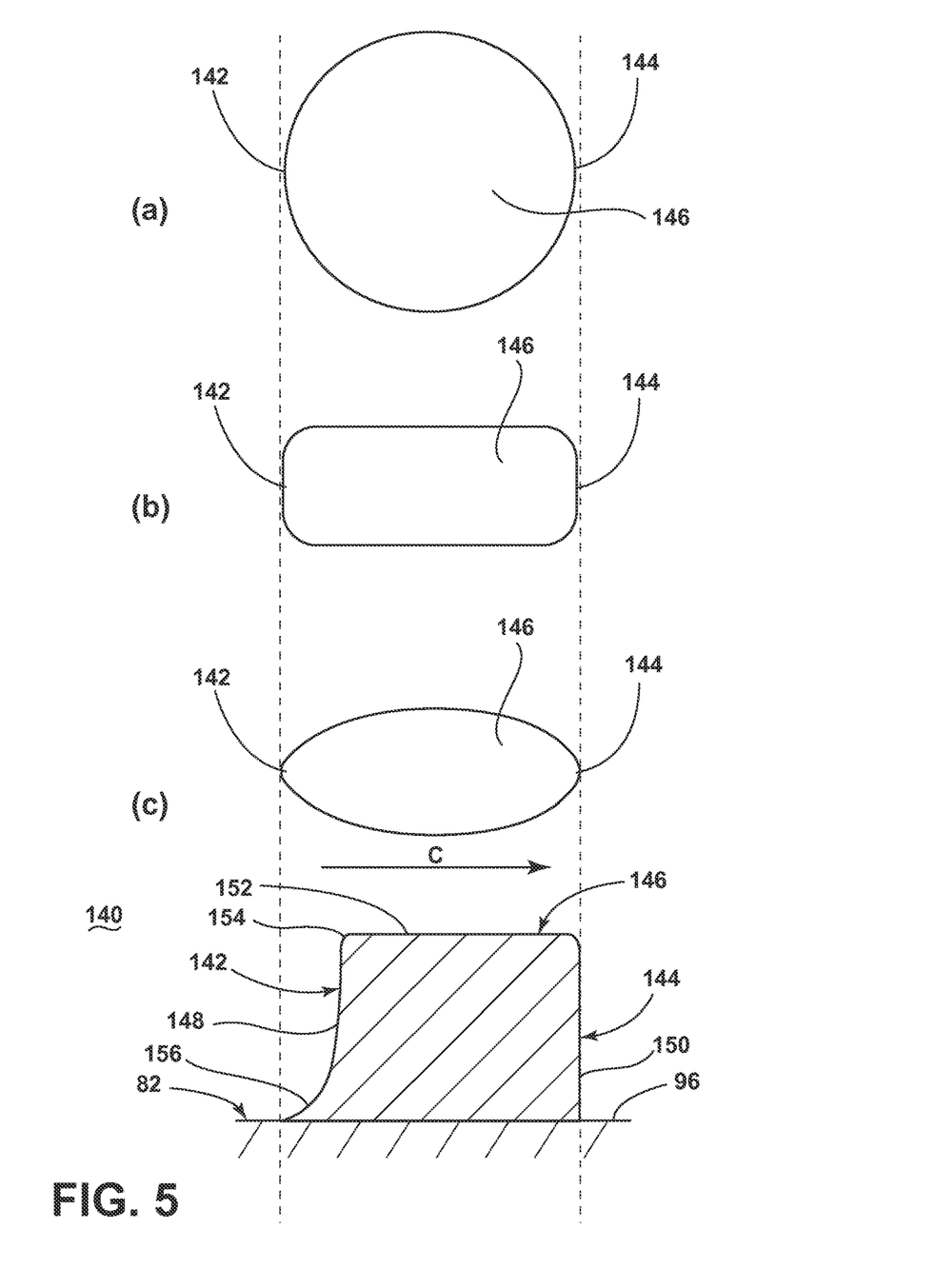
FIG. 5 is a profile view of a cooling feature for the shroud assembly from FIG. 2 according to a second embodiment of the invention.

FIG. 5 is a profile view of a cooling feature 140 for the shroud assembly 80 from FIG. 2 according to a second embodiment of the invention. The cooling feature 140 can be provided as a fin having a leading edge 142 and a trailing edge 144, relative to the cooling fluid flow C, that are joined by a top edge 146. The leading and trailing edges 142, 144 can be defined, respectively by a leading wall 148 and a trailing wall 150 that extend upwardly from the cooling surface 96, and the top edge 146 can be defined by a top wall 152 that extends between the leading and trailing walls 148, 150. The leading edge 140 converges with the top edge 144 at a ridge 154.

The leading edge 142 forms a junction 156 with the cooling surface 96. The junction 156 can be a smooth transition between the cooling surface 96 and the cooling feature 140, as shown, or can be defined by a sharp edge between the cooling surface 96 and the cooling feature 140. A smooth transition may be preferable to avoid stagnation points on the cooling surface 96. The smooth transition can be an angled structure, such as an inclined ramp, or a radiused structure, such as a concave edge. Likewise, the ridge 154 can be a radiused structure, such as a convex edge.

Figure 6:
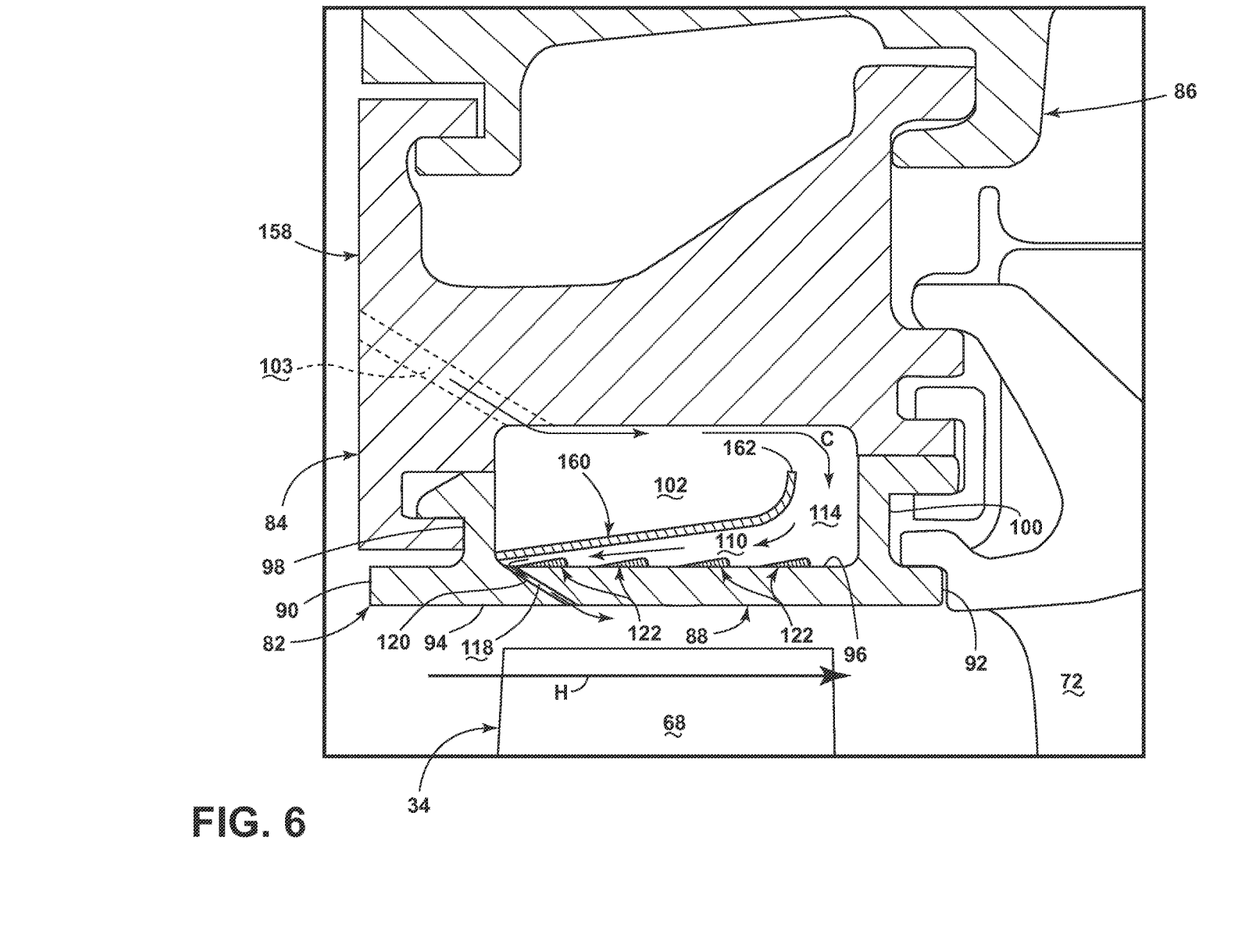
FIG. 6 is a schematic sectional view showing a shroud assembly of the engine from FIG. 1 according to a third embodiment of the invention.

FIG. 6 is a schematic sectional view showing a shroud assembly 158 of the engine from FIG. 1 according to a third embodiment of the invention. The shroud assembly 158 is substantially similar to the shroud assembly 80 from FIG. 2, and like elements will be referred to with the same reference numerals. The shroud assembly 158 differs in that the cooling fluid flow C through the shroud assembly is generally reversed. In this embodiment, the baffle 104 comprises an angled wall 160 that extends from the leading edge 90 of the shroud 82 to an end 162 that is spaced from the trailing edge 92 of the shroud, with the wall 160 being angled upwardly toward the trailing edge 92. The inlet 114 is proximate to the trailing edge 92, and is defined by the end 162 of the baffle wall 160 and the interior surface of the trailing wall 100 of the shroud 82. The passage 120 defining the outlet 118 is proximate to the leading edge 90 of the shroud 82, and is forward of the inlet 114 relative to the centerline 12 of the engine 10 (FIG. 1). The passage 120 has a flow component that is opposite in direction to the direction of the cooling fluid flow C through the region 110. The passage 120 shown is a film hole upstream of the blade 68 that extends in a generally aft direction. The cooling features 122 are also flipped with respect to the orientation of FIG. 2 in order to be oriented in the direction of the cooling fluid flow C through the region 110.

The various embodiments of systems, methods, and other devices related to the invention disclosed herein provide improved cooling for engine structures, particularly in a shroud for a turbine engine. One advantage that may be realized in the practice of some embodiments of the described systems is that the convective cooling of the shroud of the present invention removes the issue of particle accumulation associated with impingement cooling. Conventional shrouds accumulate particles in their interior, which reduces the effectiveness of cooling flow and blocks film holes or other cooling features. The reduced cooling effectiveness increases the temperature of the engine component and reduces its durability in the engine. The provision of the shaped cooling features on the cooling surface of the shroud of the invention increases heat transfer and reduces stagnation in the cooling region.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. A shroud assembly for a turbine section of a turbine engine, comprising:
   a shroud plate having a hot surface in thermal communication with a hot combustion gas flow and a cooling surface, with the cooling surface being different than the hot surface;
   a baffle overlying the shroud plate and having a first surface in fluid communication with a cooling fluid flow and a second surface, different from the first surface, spaced from the cooling surface and defining a region between the second surface and the cooling surface of the shroud plate;
   a cooling fluid inlet at least partially defined by the baffle through which the cooling fluid flow may enter the region;
   at least one cooling fluid outlet extending from the region to an exterior of the shroud plate and through which the cooling fluid flow may exit the region, wherein the at least one cooling fluid outlet is spaced from the cooling fluid inlet such that the cooling fluid flow entering the cooling fluid inlet travels downstream through the region to the at least one cooling fluid outlet to exit the region; and
   at least one shaped cooling feature located along the region between the cooling fluid inlet and the at least one cooling fluid outlet;

wherein the cooling fluid flow passing downstream through the region encounters the at least one shaped cooling feature to increase the turbulence of the cooling fluid flow; and wherein the cross-sectional area of the region continuously reduces along a portion of the region between the cooling fluid inlet and the at least one cooling fluid outlet.

2. The shroud assembly of claim 1 wherein the shroud plate has a leading edge and a trailing edge relative to the hot combustion gas flow.

3. The shroud assembly of claim 2 wherein the region extends from the leading edge to trailing edge.

4. The shroud assembly of claim 1 wherein the shroud plate overlies a turbine blade assembly and the at least one cooling fluid outlet is downstream, relative to the hot combustion gas flow, of the turbine blade assembly.

5. The shroud assembly of claim 1 further comprising an outlet passage defining the at least one cooling fluid outlet.

6. The shroud assembly of claim 5 wherein the outlet passage has a flow component opposite in direction to the direction through the region from the cooling fluid inlet to the at least one cooling fluid outlet.

7. The shroud assembly of claim 5 wherein the outlet passage has a flow component in the same direction as the direction through the region from the cooling fluid inlet to the at least one cooling fluid outlet.

8. The shroud assembly of claim 1 further comprising at least one film hole extending between the cooling surface and the hot surface of the shroud plate and defining the at least one cooling fluid outlet.

9. The shroud assembly of claim 8 wherein the at least one film hole passes through the hot surface downstream or upstream of a blade for the turbine section of the turbine engine.

10. The shroud assembly of claim 1 wherein the cross-sectional area of the region reduces in at least one location between the cooling fluid inlet and the at least one cooling fluid outlet.

11. The shroud assembly of claim 1 wherein the cross-sectional area of the region reduces at multiple locations between the cooling fluid inlet and the at least one cooling fluid outlet.

12. The shroud assembly of claim 1 wherein the region comprises a channel.

13. The shroud assembly of claim 12 wherein the width to length ratio, relative to the cooling fluid flow path, of the channel is 3:1 or less.

14. The shroud assembly of claim 1 wherein the region extends axially relative to a central axis of the turbine engine.

15. The shroud assembly of claim 1 wherein the region extends radially relative to a central axis of the turbine engine.

16. The shroud assembly of claim 1 wherein the at least one shaped cooling feature comprises multiple shaped cooling features.

17. The shroud assembly of claim 16 wherein at least some of the shaped cooling features extend upwardly from the cooling surface.

18. The shroud assembly of claim 17 wherein the at least some of the shaped cooling features form a junction with the cooling surface and the junction comprises a smooth transition.

19. The shroud assembly of claim 18 wherein the smooth transition comprises a radiused structure.

20. The shroud assembly of claim 16 wherein at least some of the shaped cooling features comprise a leading edge having an upward extent that terminates in a radiused structure.

21. The shroud assembly of claim 20 wherein the at least some of the shaped cooling features comprise a top edge extending between the leading edge and terminating at a trailing edge, and the top edge reduces in height from the leading edge to the trailing edge.

22. The shroud assembly of claim 21 wherein the top edge tapers from the leading edge to the trailing edge when viewed in a plane transverse to the flow direction of the cooling fluid flow.

23. The shroud assembly of claim 22 wherein the top edge forms an angle with the cooling surface having a vertex at the trailing edge and the angle is between 10 degrees and 40 degrees.

* * * * *